United States Patent [19]

Hsu

[11] 4,208,439

[45] Jun. 17, 1980

[54] PREPARATION OF PASTA

[76] Inventor: Jau Y. Hsu, Brookfield, Conn.

[21] Appl. No.: 844,579

[22] Filed: Oct. 25, 1977

[51] Int. Cl.$^2$ .......................... A21D 6/00; A23L 1/16
[52] U.S. Cl. .................................. 426/242; 426/451;
426/557
[58] Field of Search ............... 426/557, 559, 242, 560,
426/446–451, 621, 625

[56] References Cited

U.S. PATENT DOCUMENTS

| | | | |
|---|---|---|---|
| 2,858,218 | 10/1958 | Benson | 426/446 |
| 3,506,454 | 4/1970 | Reesman | 426/242 |
| 3,718,480 | 2/1973 | Tremblay | 426/242 |
| 3,908,029 | 9/1975 | Fredrickson | 426/242 |
| 4,044,166 | 8/1977 | Koizumi | 426/559 |

FOREIGN PATENT DOCUMENTS 871166  6/1961  United Kingdom ..................... 426/242

*Primary Examiner*—Raymond N. Jones
*Assistant Examiner*—Elizabeth A. Hatcher

[57] ABSTRACT

Instant pasta prepared by forming a sheet of gelatinized cereal flour-dough, expanding the sheeted dough under controlled conditions to impart a high degree of essentially uniform porous structure to the sheet, subdividing the expanded dough into pieces of desired shapes, thereby exposing the porous interior of said shaped pieces along their perimeter surfaces, and drying the shaped pieces. Other features of the invention appear in the following specification.

24 Claims, 8 Drawing Figures

PREPARATION OF PASTA

BACKGROUND OF THE INVENTION

This invention is concerned with the preparation of "instant" pasta, that is, dried pasta which may be reconstituted with water or other liquids for consumption within a very short period of time.

Conventional pasta, such as noodles, spaghetti or macaroni, is prepared by forming a dough from wheat flour and sufficient water to provide a total moisture content of around 30%, together with eggs and/or salt. The dough is formed by rolling and cutting, or by extrusion, into the desired shapes, which are then carefully dried to retain a dense, homogeneous texture. Such pasta requires an average cooking time of 10–20 minutes, depending on the shape.

Various processes have been described for producing pasta having a reduced cooking time, for example of several minutes, or pasta which may be reconstituted for consumption by soaking for a few minutes in hot water or broth. For example, oriental instant pasta may be prepared by rolling the dough, cutting it into noodle shapes, gelatinizing the noodles as by a steam blanch, and then deep frying the noodles. Noodles prepared in this manner have a porous texture and rehydrate more readily, but they are impregnated with fat from the deep frying operation and therefore have a materially reduced shelf life.

Alternatively, the dough may be extruded into the desired shapes, which are cooked in boiling water for about two minutes and then drained and dried. Pasta prepared in this manner reconstitutes much less easily than the oriental noodles. Size for size, they merely require a shorter cooking time than conventional pasta, and cannot be regarded as "instant" pasta.

Another process comprises shaping the dough, by extrusion or rolling and cutting, pre-drying the pasta shapes in air to a moisture content of 18–28% and completing the drying by applying microwave energy. The microwave heating partially gelatinizes the pasta; consequently, a shorter cooking time is required as compared with conventional pasta.

Attempts have been made to improve processes of the last two types by creating a porous structure in the dough through incorporation of yeasts or chemical leavening agents, or by extruding thin-walled elbows or macaroni and gelatinizing them with steam in the presence of water, thereby rendering them sufficiently firm to compensate for the thin walls, and drying. Whereas the first procedure involves a notable modification of the composition of the dough, which is not always desirable, the second is useful only for hollow pasta shapes.

SUMMARY OF THE INVENTION

A feature of the present invention is the provision of instant pasta of divers shapes, sizes, thicknesses and diameters, which are organoleptically comparable to conventional pasta but which may be reconstituted for consumption by simple immersion in hot water for a brief period ranging from half a minute to two or three minutes.

The process for preparing instant pasta according to the invention comprises providing a sheet of gelatinized dough, expanding the sheet of gelatinized dough under controlled conditions to impart a high degree of essentially uniform porous structure to the interior of the sheet, and then dividing the expanded dough into pieces of desired shapes, thereby exposing the porous interior of said shaped pieces along their perimeter surfaces, and drying the shaped pieces. It has been found that by this procedure the highly porous structure imparted to the dough during the expansion step is preserved upon drying. The multitude of pores which are exposed by the subdivision step also remain intact upon drying, and the finished pasta pieces have unusually high liquid absorption capacities and rates.

The fat-free instant pasta obtained by conventional methods do not have comparable porosity or exposed porous surfaces. Thus, even if their interiors have some degree of porosity, their surface is generally smooth and closed, inhibiting or preventing ready penetration by water or other liquids. Microscopic examination of pieces of such pasta shows that the surface is in form a sleeve of dense dough, produced by the smoothing of the surface during shaping in the uncooked state. In pasta produced according to this invention, such smoothness is found only on the surfaces corresponding to the upper and lower surfaces of the dough sheet, whereas the cut perimeter surfaces are porous rather than smooth, and readily adsorb water or other liquids at a rapid rate.

DESCRIPTION OF THE DRAWINGS

FIGS. 1 and 2 are photomicrographs (25×magnification) of pasta strands prepared in accordance with this invention. The essentially uniform, highly porous internal structure of the strands is exposed along their perimeter surfaces. The surfaces corresponding to the upper and lower surfaces of the sheet from which they were cut are, by contrast, essentially smooth, dense and non-porous. Longitudinally exposed interior cracks or crevices, which may occur during processing or handling, also aid in rehydration and are seen in the photomicrograph.

FIGS. 3 (25×magnification) and 4 (120×magnification) are photomicrographs of extruded pasta strands not in accordance with this invention. The outer surface is a dense, continuous sleeve, and the cut end portions show that the interior structure is essentially non-porous. The crevices are not longitudinally exposed, and afford little aid in rehydration.

FIG. 5 is a photomicrograph (25×magnification) of a fried (oriental) pasta strand. There are occasional blisters on the fat-impregnated surface, but the internal porosity does not generally communicate with the exterior along major surface areas, and surface pores tend to be clogged with fat, thereby impeding entry of water.

DETAILED DESCRIPTION OF THE INVENTION

Figure 1:
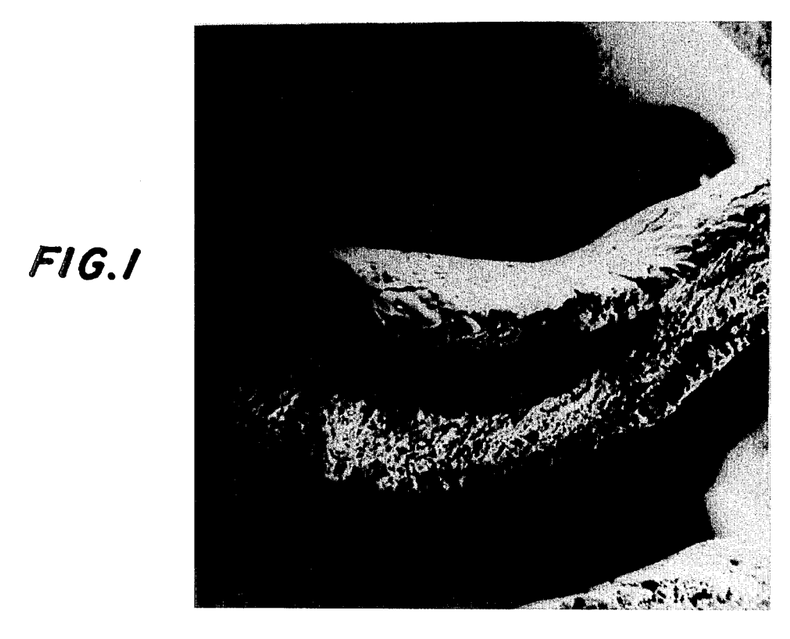
Figure 2:
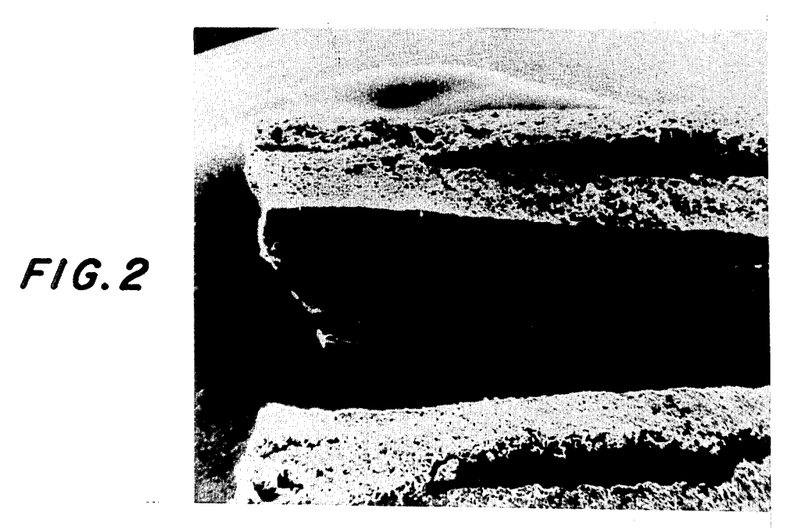
Figure 3:
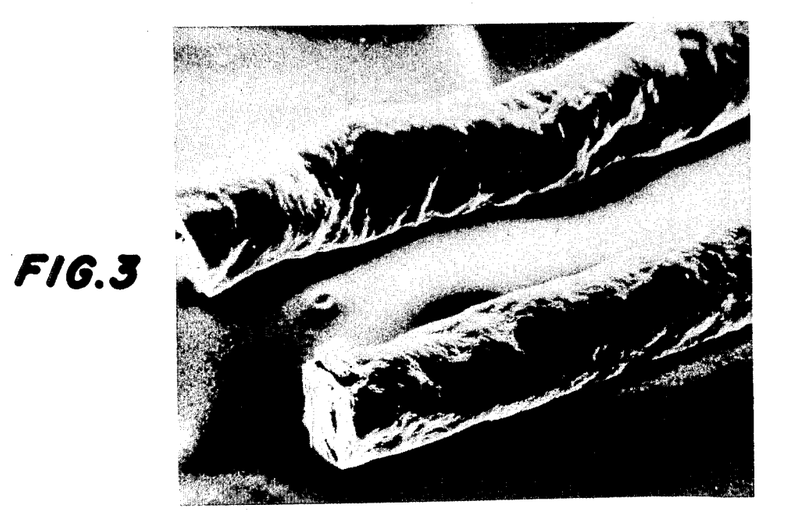
Figure 4:
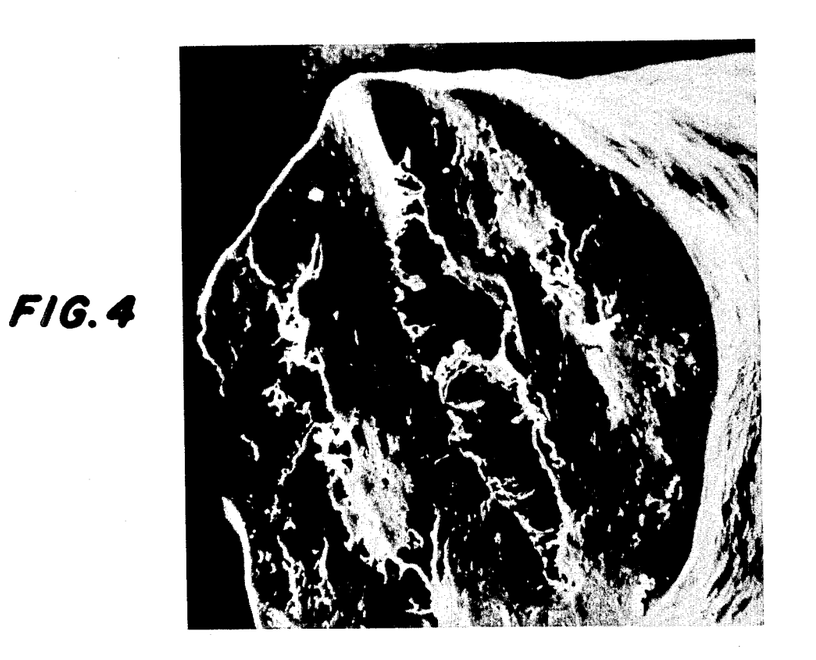
Figure 5:
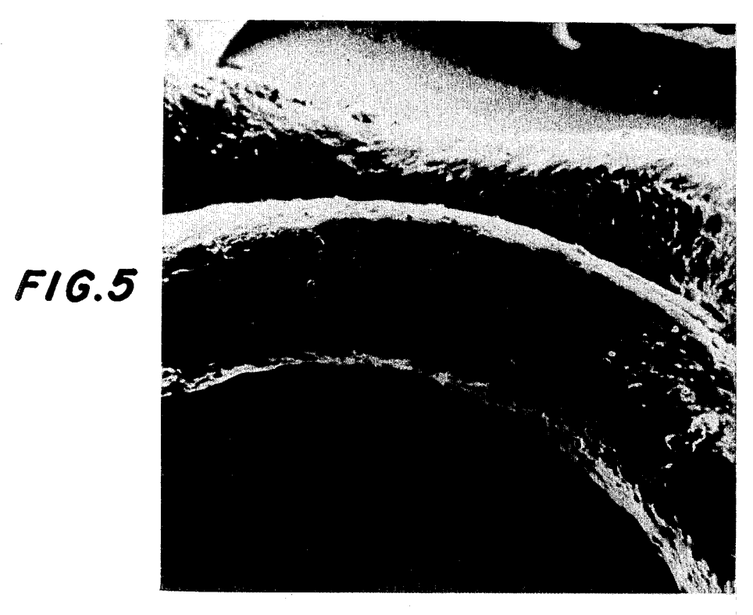
Figure 6:
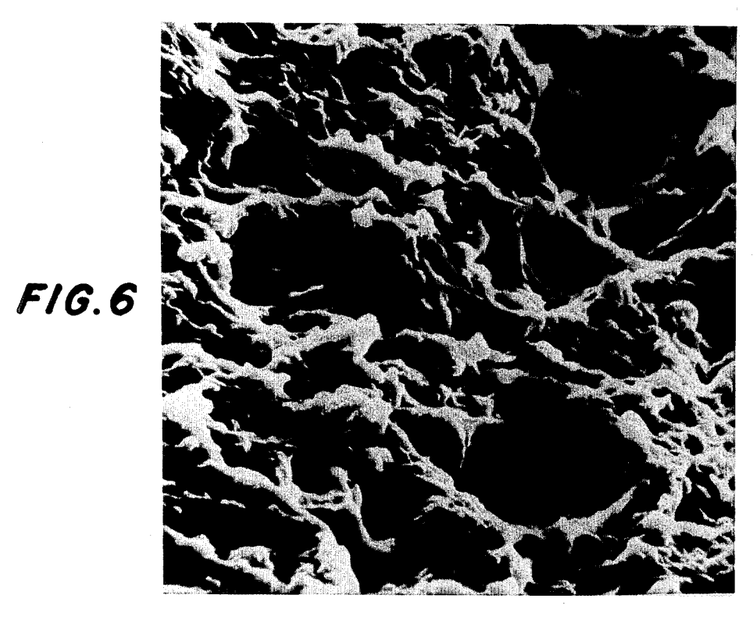
FIG. 6 is a photomicrograph (600×magnification) showing the highly porous, water-penetrable exposed interior of pasta prepared according to this invention, as viewed along the exposed (cut) perimeter surface.
Figure 7:
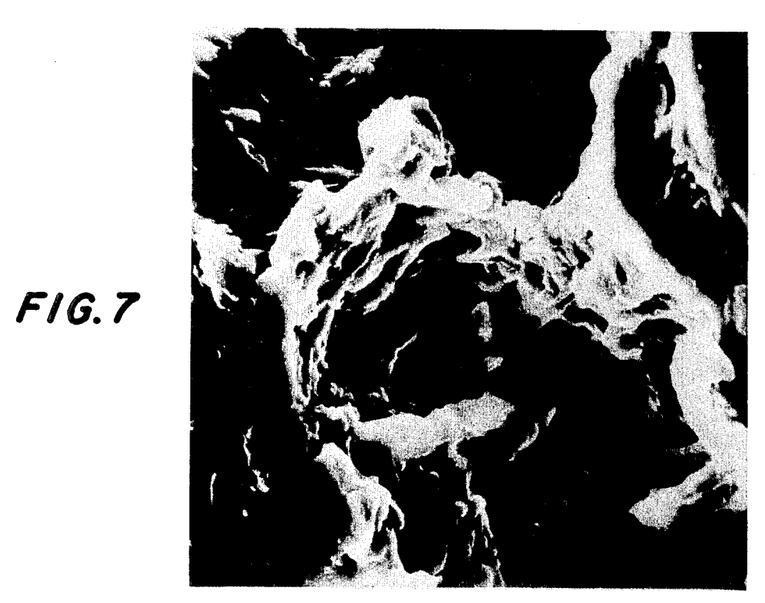
FIG. 7 is a photomicrograph (600×magnification) of the cut end surface of the extruded pasta strand of FIGS. 3 and 4, which is not in accordance with this invention. The essentially non-porous structure of the interior is best seen in the lower left and upper right portions of the photomicrograph. Crevices are seen as blank space. By comparision with FIG. 6, it is apparent that such extruded pasta does not have the internal structure of pasta prepared according to this invention.
Figure 8:
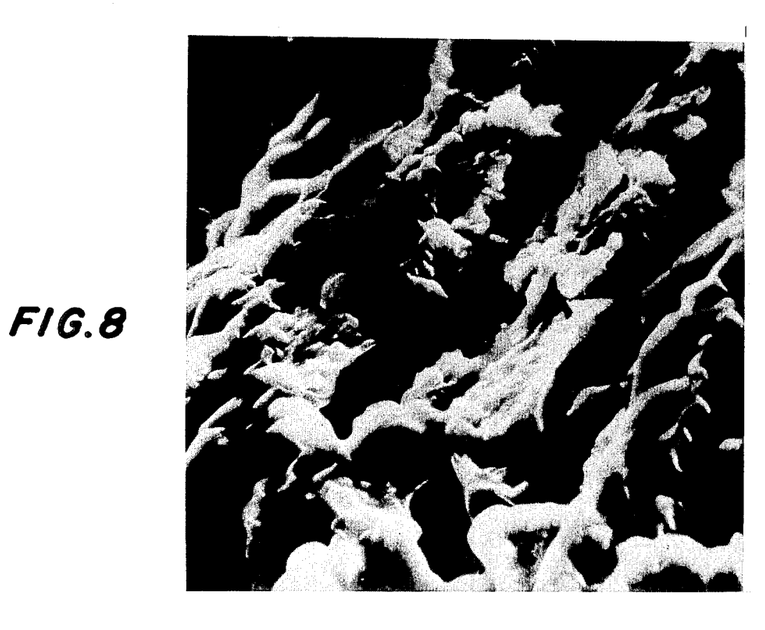
FIG. 8 is a photomicrograph (600×magnification) of the interior of a fried (oriental) pasta strand, made visible by breaking the strand. Some interior porosity is seen, but the interior lacks the essentially uniform highly porous structure of the pasta of this invention (shown in FIG. 6), and the interior is, moreover, protected by a generally non-porous fat-impregnated surface sleeve (see FIG. 5).

The starting material in the process according to the invention is cereal flour obtained by milling cereal grains, particularly wheat, for example, durum wheat. A dough is prepared from the flour (or mixtures of flours) by addition of water and optional ingredients such as fresh, frozen or dehydrated eggs, or egg yolks or whites, in appropriate amounts as may be desired or required to satisfy prescribed standards of identity for various pasta products. Salt, spices and flavorings may also be added as desired. The dough is prepared by blending the flour and the optional ingredients with a sufficient amount of water to provide a suitable moisture content, suitably at least about 27% to about 40% by weight, and then kneading. The kneading time will usually depend on the cereal flour used. Longer times are desirable when a semolina, rather than a flour, is employed. In general, 10 to 15 minutes is a sufficient period for the water to penetrate thoroughly into the flour.

The moisture content of the dough is selected having regard to the procedure and apparatus used for preparing the dough sheet, as well as the degree of expansion sought. Higher moisture contents generally provide a greater degree of expansion under given conditions, and thus also facilitate final drying, and it has also been found that moisture content is related to the procedure used to form the sheet. Doughs having higher moisture contents may be sheeted by extruding or rolling, or by a combination of such procedures. Suitable dough moisture contents can readily be determined by simple trial. Thus, for example, a moisture content of about 27%-34% by weight is generally suitable for dough which is to be shaped by extrusion in conventional pasta extruders; whereas moisture contents of about 30%-40% or more by weight are advantageous for dough that is to be rolled. Doughs of higher moisture contents (up to 40% or above) can be extruded by use of a rotary bar extruder, and the extruded dough may then be rolled, if desired, to form a thinner sheet.

The dough may be prepared from gelatinized flour, or preferably, it is first formed and then gelatinized. Gelatinization of the sheet, i.e., of starch present in the dough sheet, may conveniently be effected by exposure to steam or superheated steam at atmospheric pressure for an appropriate time, usually about 5-6 minutes, or in boiling water for about 2-3 minutes, depending on the thickness of the sheet. Steam at superatmospheric pressure may also be used.

The moisture content of the gelatinized dough sheet may be affected within relatively narrow limits by the conditions of gelatinization employed. Thus, immersion in boiling water may slightly increase the moisture content of the sheet, while use of superheated steam at atmospheric pressure may reduce the moisture content by two or three percentage points, depending on the particular conditions. It is important that the gelatinized sheet have a proper moisture content during the expansion step in order to obtain the essentially uniform highly porous structure which the process of this invention can provide. Useful moisture levels during the expansion step are obtained when the initial moisture content of the dough (before gelatinization) is about 27% to about 40% or greater, and it is preferred that the initial moisture content be at least about 36%. Accordingly, employment of a rotary bar extruder or other equipment which can accommodate doughs of higher moisture contents than can be accommodated in conventional pasta extrusion equipment is preferred.

The expansion step is best carried out by uniform application of microwave energy to the gelatinized dough sheet. Expansion may be induced by passing the sheet through a microwave oven or tunnel, with controlled adjustment of power input and residence time according to mass in such fashion as to impart a uniform and highly porous structure to the sheet, the moisture content of which is controlled as above described. The expansion step may reduce the moisture content of the sheet by about 3 to 12 percentage points.

Without wishing to be bound by theory, it is believed that sheets of higher moisture content are more plastic, and that a very large number of small uniform pores are more readily formed therein than in a sheet of lesser moisture content. Thus, it has been found, for example, that the ultimate dried product according to this invention when formed from a dough of 37% moisture content or above has a strikingly uniform porous structure; and as compared with product made from dough of 35% moisture content or less, has a significantly softer texture upon reconstitution, a creamy (rather than yellow) appearance, and that narrow strands cut therefrom are generally round, rather than flat, after final drying.

It has also been found that when hot air or dielectric heating temperatures of about 150° C. or above are used in place of microwave energy some expansion does occur, but the pore size and pore structure are markedly less uniform, and there is substantially greater tendency towards blistering. Moreover, significantly greater time and energy input are required, and more complex equipment is needed.

Following the expansion step, the sheet is cut, using conventional equipment, into noodles or strands, or formed into any other desired shapes such as letters, crosses or stars by stamping. Cutting or shaping of the expanded dough sheet may be facilitated by cooling the sheet, as by exposure to ambient air or, more desirably, to a current of ambient or cooled air, to reduce the tackiness of the sheet surfaces. The term "sheet" as used herein is not restricted to flat forms, as curved or even cylindrical configurations can be treated in the manner described and then slit into strips or other shapes which expose the porous interior along the cut perimeter surfaces.

Final drying, desirably to a residual moisture content of about 10% or below by weight, preferably about 3-7% by weight, may be effected by any suitable means, such as microwave radiation, hot air, dielectric heating or in a fluidised bed. It is particularly convenient and preferred to use a multimode microwave cavity or tunnel, and to introduce the shaped pasta to the drying operation in the containers (such as cups or bowls) from which they will be ultimately consumed. While the loss of moisture during the expansion step renders the pasta less susceptible to further pore formation during the drying step, care should nonetheless be taken to regulate the drying conditions in a manner which does not adversely affect the essentially uniform highly porous internal structure imparted by expansion. Thus unduly intense energy levels relative to mass and residence time should be avoided, particularly at the outset of the drying procedure.

There are thus provided in accordance with the invention shaped pasta pieces characterized by an essentially uniform highly porous internal structure, the porous internal structure being exposed along the perimeter surfaces of said pieces. The shaped pieces thereby have a high liquid absorption capacity and a high liquid absorption rate.

The exposed porous structure of the dried, shaped pasta permits ready reconstitution by addition of water or other liquid. While an excess of liquid may be employed, only that amount necessary for reconstitution need be used. From the organoleptic standpoint, products obtained in accordance with the present invention are equivalent to conventional pasta, but they may be prepared for consumption in about half a minute to about three minutes, depending on the average width, thickness and length of the individual pieces, by simple addition of hot water. They are particularly suitable for preparing instant noodle soup and casserole products. Thicknesses not exceeding about 2 mm, and average widths not exceeding about 5 mm, preferably not exceeding about 2 mm, are preferred.

The invention is further illustrated by reference to the following examples, in which all parts, percentages and ratios are by weight.

EXAMPLE 1

3375 Parts of durum flour, 375 parts of egg white and 1220 parts of water containing 30 parts of salt are blended in a dough mixer for about 10 minutes. The resulting dough, containing 39% moisture, is extruded in a rotary bar extruder, and the extrudate is rolled into sheets 1.3 mm thick and 15 cm wide. The sheets are gelatinized by contact with superheated steam (107°–110° C.) for 6 minutes, whereby the moisture content of the sheets is reduced to 34–36%. The sheets are then passed through a multimode microwave cavity at 1.6–1.9 kw input power with a residence time of 70–100 seconds for an application loading of 400–500 g of dough sheet. The expanded sheets are cut into strands 1.5 mm wide and 5 cm long, containing 24–28% moisture. The strands are then dried in loose form in a fluidised bed drier at temperatures of 130°–140° C. for 1–2 minutes.

The exposed cut surfaces of the strands reveal that the interior has an essentially uniform highly porous structure. The pieces are reconstituted in less than 3 minutes by contact with hot water. The dried pieces may be mixed before reconstitution with dried seasonings, vegetable pieces, meats and other food ingredients which are reconstitutable upon addition of hot water.

EXAMPLE 2

30 parts of salt, 775 parts of whole egg and 900 parts of water are mixed and kneaded for 10 minutes with 3295 parts of durum flour. The resulting dough, containing 38% moisture, is extruded by a rotary bar extruder, and the extrudate is then rolled into sheets 1 mm thick and 15 cm wide. The sheets are gelatinized with superheated steam at 107°–110° C. at atmospheric pressure in 5 minutes, whereby their moisture content is reduced to 34–36%. The sheets are then passed through a microwave unit at 1.6–1.9 kw power input with a residence time of 70 to 100 seconds for an application loading of 300–400 g of dough sheets. The sheets are then cut into noodle form, 5 mm to 1 cm wide and 5 cm long, containing 24–28% moisture. The noodles are then dried in loose form in a fluidised bed drier at temperatures of 130°–140° C. for 1–2 minutes, or are alternatively passed through a microwave unit at 4.5 kw power input with a residence time of 7–8 minutes for an application loading of 1500 g of noodles.

The dried noodles readily reconstitute upon addition of hot water in slightly more than two minutes. The dried noodles may be blended with other reconstitutable food ingredients and seasonings, as in Example 1.

EXAMPLE 3

3420 parts of durum flour and 1550 parts of water containing 30 parts of salt are blended in a dough mixer for about 10 minutes. The resulting dough, containing 39% moisture, is extruded in a rotary bar extruder, and the extrudate is then rolled into sheets 1.1 mm thick and 15 cm wide. The sheets are gelatinized with superheated steam at 140° C.–150° C., whereby the moisture content is reduced to 34–36%. The sheets are then passed through a multimode microwave unit at 1.6–1.9 kw input with a residence time of 70–100 seconds for an application loading of 300–400 g of dough sheet. The sheets are then cut into vermicelli form 1 mm wide and 5 cm long, containing 24–28% moisture. The vermicelli are then dried in loose form in a fluidised bed drier at temperatures of 130°–140° C. for 1–2 minutes.

The dried vermicelli reconstitute upon addition of hot water in less than 2 minutes.

EXAMPLE 4

30 Parts of salt, 775 parts of whole egg and 900 parts of water are mixed and kneaded for 10 minutes with 3295 parts soft wheat flour. The resulting dough, which contains 38% moisture, is extruded in a rotary bar extruder and the extrudate is then rolled into sheets 1 mm thick and 15 cm wide. The sheets are gelatinized with steam at atmospheric pressure for 4 minutes, whereby the moisture content is reduced to 36–37%. The sheets are then passed through a microwave unit at 1.8 kw power input with a residence time of 40 to 60 seconds for an application loading of 300–400 g of dough sheets. The sheets are cut into noodle-like shapes 1.1 mm wide and 1 cm long, containing 24–28% moisture. The noodle-like shapes are then dried in loose form in a fluidised bed drier at a temperature of about 120° C. for 3–4 minutes, or alternatively may be passed through a microwave unit at 4.5 kw input with a residence time of 7–8 minutes for an application loading of 1500 g of noodle-like shapes.

The dried noodle-like shapes reconstitute in about 40 seconds upon addition of hot water, and are well adapted for use in instant soups and bouillons.

EXAMPLE 5

3475 Parts of durum flour, 275 parts of egg whites and 1200 parts of water containing 50 parts of salt are blended in a dough mixer for about 12 minutes. The resulting dough, containing 35% moisture, is rolled into sheets 1.3 mm thick and 10–20 cm wide. The sheets are gelatinized with steam at atmospheric pressure for 6 minutes, whereby the moisture content is reduced to 31%. The sheets are then passed on a conveyor through a microwave unit with a residence time of 90 seconds. The unit, of the multimode microwave cavity type, is two meters in length and delivers 2.2 kw to about 500 g of dough sheets. The sheets are then cut into spaghetti-like strands 1.5 mm in width, containing 25% moisture.

40 g portions of the spaghetti-like strands are grouped in cake form and placed in beakers, and the beakers are passed through a 4 kw microwave tunnel. The residence time of each beaker is 12 minutes, the tunnel capacity being 1.5 kg. The pasta leaving the tunnel have a moisture content of 3% to 7% and retain the cake shape which they acquired upon being placed in the beakers.

Upon addition of hot water to the spaghetti cakes they reconstitute in about 2 minutes or less.

EXAMPLE 6

The procedure of Example 5 is repeated, except that the dough is rolled into sheets 1.5 mm thick, gelatinization is effected with steam for 7 minutes and the cut spaghetti strands have a width of 1.7 mm. After drying, the moisture content is 5%.

The dried spaghetti-like strands reconstitute with hot water within 3 minutes.

EXAMPLE 7

The procedure of Example 5 is repeated, except that following gelatinization and prior to cutting, the sheets are subjected to a current of hot air at temperatures between 100° C. and 150° C. for 5–10 minutes in place of microwave expansion.

EXAMPLE 8

The procedure of Example 5 is repeated, except that the starting dough has a moisture content of 32%, and the sheets are formed by extrusion in a conventional pasta extruder.

EXAMPLE 9

The procedure of Example 8 is repeated, except that microwave expansion is replaced by surface drying of the dough sheets with hot air, as in Example 7.

EXAMPLE 10

The procedure of Example 5 is repeated, except that microwave expansion is replaced by heating of the sheets for 5 minutes in a current of air having a temperature of 205° C.

EXAMPLE 11

The procedure of Example 5 is repeated, except that the spaghetti forms are not formed into cakes in beakers, and are dried loose with hot air at 205° C. for 8 minutes.

EXAMPLE 12

The procedure described in Example 11 is repeated, except that the flour content of the dough is a blend of equal parts of durum and soft wheat flours; and final drying is effected for 15 minutes at 145° C.

EXAMPLE 13

50 Parts of salt, 775 parts of whole eggs and 825 parts of water are mixed and kneaded for 12 minutes with 3350 parts of durum flour. The resulting dough, containing 34% moisture, is rolled into sheets 1 mm thick, which are gelatinized with steam at atmospheric pressure for 5 minutes. The sheets are then passed through a 2.2 kw microwave oven having a capacity of 500 g. The residence time is 90 seconds. The sheets are then cut into noodles 2 mm–1 cm wide, and 40 g portions of the noodles are placed in beakers. The noodle cakes are then dried as described in Example 5.

The dried noodles reconstitute readily upon addition of hot water.

COMPARATIVE RUN A

For comparison purposes, quick-cooking pasta are conventionally prepared from a dough having the following composition: 3475 parts of durum flour, 275 parts of egg whites and 1200 parts of water containing 50 parts of salt. The dough is blended in a dough mixer for about 12 minutes. The resulting dough having a moisture content of 30%, is then extruded as cylindrical shapes 1.3 mm in diameter, using a conventional pasta extruder, and are cut into 5 cm lengths. After gelatinization with steam at atmospheric pressure for 7 minutes, they are surface dried in a current of hot air at 205° C. for 5 minutes, and then subjected to microwave radiation at 4.5 kw input during a residence time of 8 minutes and an application loading of 1500 g, to reduce their moisture content to 3%–7%.

Pasta prepared in this manner do not have the exposed porous structure of the pasta of this invention. The microwave radiation does create some internal porosity, and blisters the outside of the pasta forms, but the surface remains sheathed and closed, and the internal pores do not readily communicate with the liquid in which the pasta forms are immersed for reconstitution. Consequently, periods of 5 to 6 minutes or more are required for reconstitution with hot water.

EXAMPLE 14

The reconstitution qualities of pasta prepared in accordance with certain of the preceding examples are compared by rehydrating aliquots with boiling water (175 cc of water to 35 g of pasta), and determining the amount of water absorbed after a standard period of 3 minutes by weighing the drained noodles and subtracting their dry weight. The results are set forth in the TABLE below:

TABLE

| Pasta per Example No. | 5 | 7 | 8 | 9 | 10 | 11 | 12 | Run A |
|---|---|---|---|---|---|---|---|---|
| Grams of water absorbed per gram of dry pasta | 2.6 | 2.0 | 2.3 | 1.7 | 2.2 | 2.1 | 2.1 | 1.1 |

As appears from the foregoing table, the conventional so-called quick-cooking pasta (Comparative Run A) absorbed only slightly more than its own weight of water in the standard 3-minute period, whereas the expanded pastas of this invention absorbed up to 2-178 times their own weight of water within that period. When hot air drying of sheets having the same initial moisture content was substituted for microwave expansion (compare Examples 5 and 7), the water absorption ratio dropped by 23%. When the same substitution was made using a dough sheet of lesser moisture content (compare Examples 8 and 9), the water absorption ratio decreased by 26%. Using microwave expansion, a two percentage point decrease in initial dough moisture content resulted in a 12% decrease in water absorption ratio (compare Examples 5 and 8). Use of blended flour did not affect the water absorption ratio (compare Examples 11 and 12). Final drying of loose articles by hot air give a lower water absorption ratio than when the articles were dried in cake form by microwave (compare Examples 5 and 12).

The data further show the important advantage of cutting forms from the dough sheet prior to final drying, so that the interior of the sheet is exposed along the perimeter surfaces. Thus, even when microwave expansion is not employed, the cut pasta pieces exhibit superior water absorption as compared with the closed-surface extrudates of Comparative Run A (82% better in Example 7; 55% better in Example 9; 100% better in Example 10).

Tenderness and texture of the pasta after rehydration is related to the water absorption ratio shown in the table. The conventionally prepared quick-cooking pasta of Comparative Run A has the toughest texture of all the samples, while the pastas of Examples 5 and 7 are the most tender.

In lieu of using hot or boiling water to reconstitute the dried pasta forms, cold or warm water may be used. If a hot dish is desired, the mixture of water and pasta (with optional other ingredients) may be heated, most suitably in a microwave oven. This method is well adapted to so-called "fast food preparations.

I claim:

1. Process for preparing readily rehydratable dry pasta, which comprises providing a sheet of gelatinized cereal flour dough, the sheeted dough having a moisture content of at least about 27% to about 40% or more by weight prior to gelatinization, expanding the sheeted dough to impart a high degree of essentially uniform porous structure to the interior of the sheet, dividing the expanded sheet into pieces of desired shapes, thereby exposing the porous interior of each said shaped piece along the resultant perimeter surfaces where the said piece was divided from the said sheet, and drying the shaped pieces.

2. Process according to claim 1, wherein the sheeted dough has a moisture content of at least about 36% to about 40% by weight, prior to gelatinization.

3. Process according to claim 2, wherein the dough is sheeted in a rotary bar extruder.

4. Process according to claim 3, wherein the extrudate is rolled to decrease its thickness.

5. Process according to claim 1, wherein the sheeted dough is expanded by uniform application of microwave radiation with controlled adjustment of power input and residence time according to mass so as to impart an essentially uniform and highly porous internal structure to the interior of the sheet.

6. Process according to claim 5, wherein the moisture content of the sheet is reduced by about 3 to about 12 percentage points during the expansion step.

7. Process according to claim 1, wherein the cut pieces are dried to a residual moisture content of about 10% or less by weight.

8. Process according to claim 7, wherein the pasta pieces are dried by application of microwave radiation.

9. Process according to claim 8, wherein pasta pieces are grouped into cake forms prior to drying.

10. Process according to claim 9, wherein the cakes are formed by placing pasta pieces into individual containers prior to final drying.

11. Process according to claim 1, wherein the sheet of dough has a thickness not exceeding about 2 mm.

12. Process according to claim 11, wherein the dried pasta pieces are reconstituted in boiling water rehydrating in about 3 minutes or less.

13. Process according to claim 11, wherein the dried pasta pieces are admixed with boiling water, to absorb at least about twice their dry weight of water within 3 minutes.

14. Process according to claim 11 in which the expanded sheet is cut into shapes having an average width not exceeding about 5 mm.

15. Process according to claim 14, wherein the dried pasta pieces are reconstituted in boiling water rehydrating within 1 minute or less.

16. Process for preparing readily rehydratable dry pasta, which comprises forming a sheet of wheat flour dough containing at least 36% moisture by weight, gelatinizing starch contained in the sheeted dough, expanding the sheeted dough by uniform application of microwave radiation with controlled adjustment of power input and residence time according to mass so as to impart an essentially uniform highly porous structure to the interior of the sheet, dividing the expanded sheet into pieces of desired shapes, thereby exposing the porous interior of each said shaped piece along the resultant perimeter surfaces where the said piece was divided from the said sheet, and drying the shaped pieces.

17. Process according to claim 16, wherein said dough also contains one or more members selected from the group consisting of other cereal flours, fresh, frozen or dehydrated eggs, egg yolks, egg whites and seasonings.

18. Process according to claim 16, wherein the dough is first extruded in a rotary bar extruder and then rolled to desired thickness.

19. Process according to claim 16, wherein the thickness of the sheeted dough does not exceed about 2 mm.

20. Process according to claim 19, wherein the expanded dough is cut into pieces having an average width not exceeding about 5 mm.

21. Process according to claim 16, wherein the shaped pieces are dried to a moisture content of about 10% or less by weight.

22. Process for preparing readily rehydratable dry pasta, which comprises providing a sheet of gelatinized cereal flour dough prepared from gelatinized flour, said sheet having a moisture content of at least about 27% to about 40% or more by weight, expanding the sheeted dough to impart a high degree of essentially uniform porous structure to the interior of the sheet, dividing the expanded sheet into pieces of desired shapes, thereby exposing the porous interior of each said shaped piece along the resultant perimeter surfaces where the said piece was divided from the said sheet, and drying the shaped pieces.

23. The readily rehydratable pasta prepared by the process of claim 1 having a moisture content of about 10% or less by weight and being capable of absorbing at least about twice its weight of water within three minutes when admixed with boiling water.

24. The readily rehydratable pasta prepared by the process of claim 16 having a moisture content of about 10% or less by weight and being capable of absorbing at least about twice its weight of water within three minutes when admixed with boiling water.

* * * * *

UNITED STATES PATENT AND TRADEMARK OFFICE
CERTIFICATE OF CORRECTION

PATENT NO. : 4,208,439

DATED : June 17, 1980

INVENTOR(S) : Jau Y. Hsu

It is certified that error appears in the above–identified patent and that said Letters Patent are hereby corrected as shown below:

On the front title page of the patent, -- Assignee: Societe d'Assistance Technique Pour Produits Nestle S.A., Lausanne, Switzerland --, should be present.

Col. 5, line 30 "Parts" should read -- parts --.

Col. 6, line 56, "Parts" should read -- parts --.

Col, 7, line 58, "Parts" should read -- parts --.

Col. 8, line 50, "2-178" should read -- 2-1/2 --.

Col. 8, line 64, "give" should read -- gave --.

Col. 9, line 21, "food" should read -- food" --.

Signed and Sealed this

Second Day of September 1980

[SEAL]

Attest:

SIDNEY A. DIAMOND

Attesting Officer

Commissioner of Patents and Trademarks